United States Patent
Kumagai

[11] Patent Number: 5,159,645
[45] Date of Patent: Oct. 27, 1992

[54] METHOD FOR RECOGNIZING CONCAVITIES IN AN IMAGE SUBJECT TO CHARACTER RECOGNITION

[75] Inventor: Ryohei Kumagai, Tokyo, Japan
[73] Assignee: Ezel Inc., Tokyo, Japan
[21] Appl. No.: 784,126
[22] Filed: Oct. 29, 1991

Related U.S. Application Data

[63] Continuation of Ser. No. 334,322, Apr. 7, 1989, abandoned.

[30] Foreign Application Priority Data

May 12, 1988 [JP] Japan ................................. 63-115757

[51] Int. Cl.$^5$ .............................................. G06K 9/48
[52] U.S. Cl. .......................................... 382/22; 382/21
[58] Field of Search ....................... 382/21, 22, 25, 26, 382/48

[56] References Cited

U.S. PATENT DOCUMENTS

| | | |
|---|---|---|
| 3,755,780 | 8/1973 | Sammon et al. ........................ 382/21 |
| 4,183,013 | 1/1980 | Agrawala et al. ..................... 382/22 |
| 4,597,101 | 6/1986 | Kishimoto et al. .................... 382/21 |
| 4,791,482 | 12/1988 | Barry et al. .......................... 382/21 |
| 4,876,728 | 10/1989 | Roth ..................................... 382/21 |
| 4,949,281 | 8/1990 | Hillenbrand et al. ................. 382/22 |
| 4,982,342 | 1/1991 | Moribe et al. ........................ 382/21 |
| 5,018,211 | 5/1991 | Jaffe et al. ............................ 382/22 |
| 5,050,222 | 9/1991 | Lee ....................................... 382/21 |

OTHER PUBLICATIONS

Rafael C. Gonzalez, Paul Wintz; Digital Image Processing, Second Edition, Nov. 1987, pp. vii, 397–398.

*Primary Examiner*—Jose L. Couso
*Attorney, Agent, or Firm*—Cushman, Darby & Cushman

[57] ABSTRACT

An image processing method for finding concavity of a configuration comprising steps; arranging boundary pixels of the configuration according to chain order with indicating top points on convex hull of the configuration; and determining that a concavity is defined by the boundary pixels when a boundary pixel of a chain code is found, which chain code indicates a concavity.

7 Claims, 4 Drawing Sheets

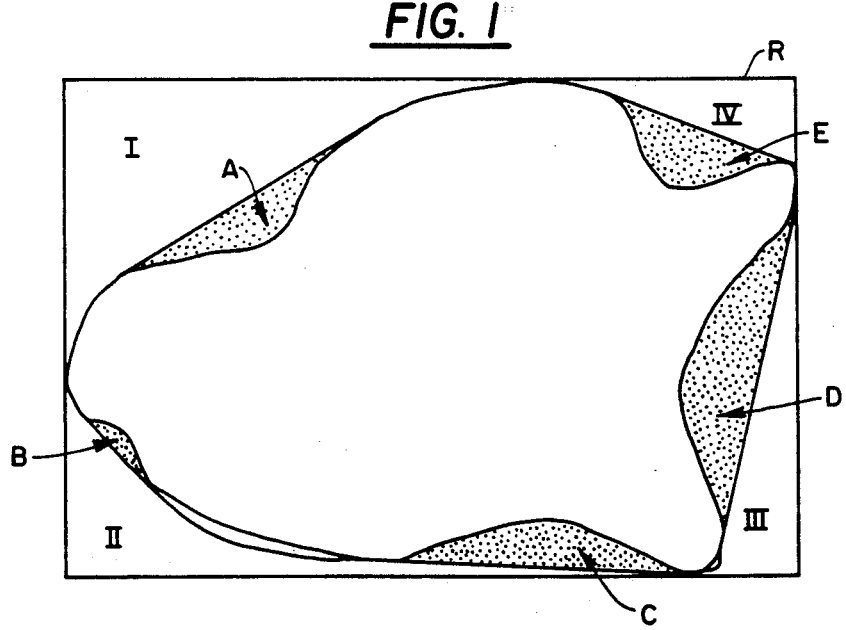

QUADRANT II

QUADRANT III

QUADRANT IV

METHOD FOR RECOGNIZING CONCAVITIES IN AN IMAGE SUBJECT TO CHARACTER RECOGNITION

This is a continuation of Application Ser. No. 07/334,322, filed on Apr. 7, 1989, now abandoned.

FIELD OF THE INVENTION

The present invention relates to an image processing method for calculating characteristics parameters of a concavity.

BACKGROUND OF THE INVENTION

For recognizing a handwritten character such as "R" in FIG. 1, concavities 1 and 2 and a hole are important characteristics. Therefore, convexity and concavity are important characteristics of a configuration. The smallest convex configuration including a configuration to be processed (original configuration hereinafter) is called convex hull. By subtracting the original configuration from the convex hull, concavities and holes are extracted, for characterizing the original configuration. However, the convex hull cannot easily generated in the strict meaning, in the conventional method. In the conventional method, top points of convex hull are successively connected by straight lines. In a digital image, a straight line is different from a line in the mathematical meaning, because a digital image consists of dispersed pixels and mathematical continuous line cannot always be drawn. The digital line may be an approximation and pixels outside of the convex hull may be took as pixels on the line. When a pixels outside of the convex hull is took, the configurations generated by the above subtraction represent other characteristics than the characteristics to be extracted. Usually a graphic processor is used for drawing lines, so lines are drawn according to the algorithm of the processor. It is not guaranteed that a suitable convex hull for recognition is always generated.

For evaluating a concavity, several characteristic parameters are proposed; chord length of a concavity, inner peripheral length of a concavity, concavity ratio etc. Unless concavities are exactly extracted, calculation of these parameters become in vain.

SUMMARY OF THE INVENTION

The present invention has an object to provide an image processing method for extracting exact concavities.

According to the present invention, between adjacent two top points of a convex hull, border pixels between the top points are successively evaluated from the chain code each border pixel has or from the distance between each pixels and a line connecting the top points so as to found the boundary pixels defines concavity or not.

BRIEF DESCRIPTION OF DRAWINGS

FIG. 1 shows a configuration having concavities;
FIG. 2 shows a table of data of boundary pixels of a configuration to be processed.

PREFERRED EMBODIMENT OF THE PRESENT INVENTION

Exemplary preferred embodiments of the image processing method according to the present invention will be described in detail hereinafter.

FIG. 1 shows a configuration including concavities A, B, C, D and E, hatched. A horizontal rectangle R circumscribed about the configuration is shown, as well. The configuration is divided into quadrants from first to fourth by the rectangle R. On tracing boundary pixels of the configuration, boundary pixels from upper side left contact point to left side lower contact point belong to the first quadrant, boundary pixels from left side lower contact point to lower side right contact point belong to the second quadrant, boundary pixels from lower side right contact point to right side upper contact point belong to the third quadrant, and boundary pixels from right side upper contact point to upper side left contact point belong to the fourth quadrant. The number of first to fourth may be changed as far as they are defined according to predetermined rule. Anyway, the information concerning quadrant is important for the processing below.

A table in FIG. 2 is generated, which includes informations of boundary pixels arranged in chain code order; whether they are top points on convex hull; x- and y-coordinates thereof; to which quadrant the points belong. In FIG. 2, top points on convex hull are indicated by Y or N, Y means top points and N means not.

Figure 3A:
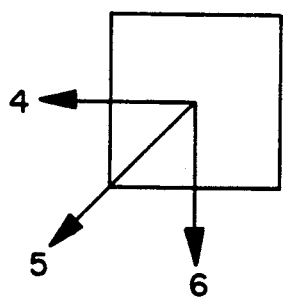
FIGS. 3A-D show a rule of chain code.
Figure 3B:
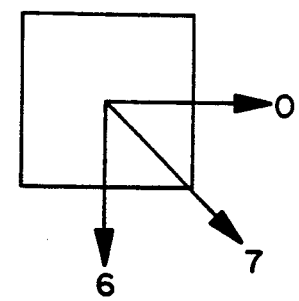
Figure 3C:
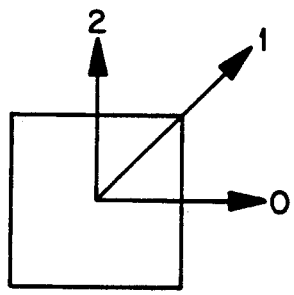
Figure 3D:
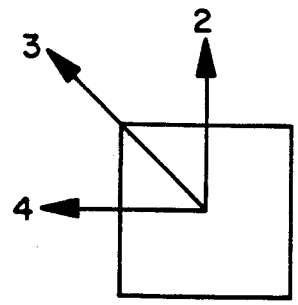

FIGS. from 3(a) to 3(d) show the relationship between the quadrant and the chain code. FIG. 3(a) shows chain codes of boundary pixels in the first quadrant but not in a concavity. FIG. 3(b) shows chain codes of boundary pixels in the second quadrant but not in a concavity. FIG. 3(c) shows chain codes of boundary pixels in the third quadrant but not in a concavity. FIG. 3(d) shows chain codes of boundary pixels in the fourth quadrant but not in a concavity. It will be understood from FIGS. 3(a) to 3(d) that chain code other than from 4 to 6 in the first quadrant indicates a concavity, chain code other than from 6 to 0 in the second quadrant indicates a concavity, chain code other than from 0 to 2 in the third quadrant indicates a concavity, and chain code other than from 2 to 4 in the fourth quadrant indicates a concavity.

In the case that no chain code indicating concavity can be found, the following processing is necessary.

Figure 4:
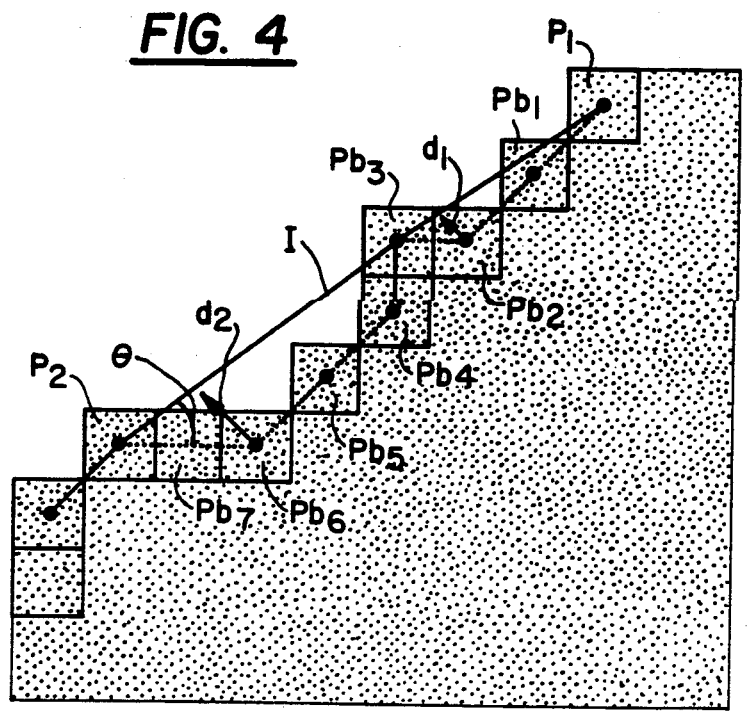
FIG. 4 shows a portion including boundary pixels of a configuration.

In FIG. 4, top points P1 and P2 on the convex hull are found. The inclination of the line 1 connecting P1 and P2 is calculated. The inclination is $5/7=0.714$ and the inclination angle $\theta$ is 35.5 deg. Then boundary pixels are traced from P1 to P2. The distances between the line 1 and the boundary pixels are evaluated. For calculating the distance, a relationship between the chain code and distance increment $\Delta d$ is calculated in advance. The distance increment $\Delta d$ of boundary pixels traced are integrated so as to calculate a distance between the line 1 and the boundary pixel just traced.

As for the configuration in FIG. 4, the relationship is shown in the following Table 1.

TABLE 1

| Chain code | $\Delta^d$ |
| --- | --- |
| 4 | $-\sin\theta = -0.581$ |

TABLE 1-continued

| Chain code | $\Delta^d$ |
| --- | --- |
| 5 | $\cos\theta - \sin\theta = 0.233$ |
| 6 | $\cos\theta = 0.814$ |

In Table 1, $\Delta d$ is defined as positive when it has inward direction from the line 1.

The boundary pixels from Pb1 to Pb7 between P1 and P2 have distances from the line 1, as shown in Table 2. The distances are calculated by the integration of d as described above.

TABLE 2

| Boundary pixel | Distance |
| --- | --- |
| Pb1 | 0.233 |
| Pb2 | 0.466 |
| Pb3 | −0.115 |
| Pb4 | 0.699 |
| Pb5 | 0.902 |
| Pb6 | 1.135 |
| Pb7 | 0.554 |

Here, a rule is applied that boundary pixels between adjacent top points defines a concavity when one or more boundary pixels have distance not less than "1" from the line connecting the top points.

In Table 2, the pixel Pb6 has distance of "1.135". On tracing boundary pixels from Pb1 toward Pb7, it is found first on the point Pb6 that the boundary pixels define concavity.

By counting number of boundary pixels from Pb1 to Pb7 on tracing them, the inner peripheral length of a concavity is calculated. If it is found that the boundary pixels do not define a concavity, the counted value is canceled.

The chord length of a concavity is calculated by calculating distance between top points P1 and P2. The distance is calculated by the x- and y-coordinates of P1 and P2.

Concavity ratio is calculated from the inner peripheral length, chord length of a concavity and peripheral length of the configuration, as follows.

Concavity ratio = (inner peripheral length) / {(peripheral length) × (chord length)}

Figure 5:
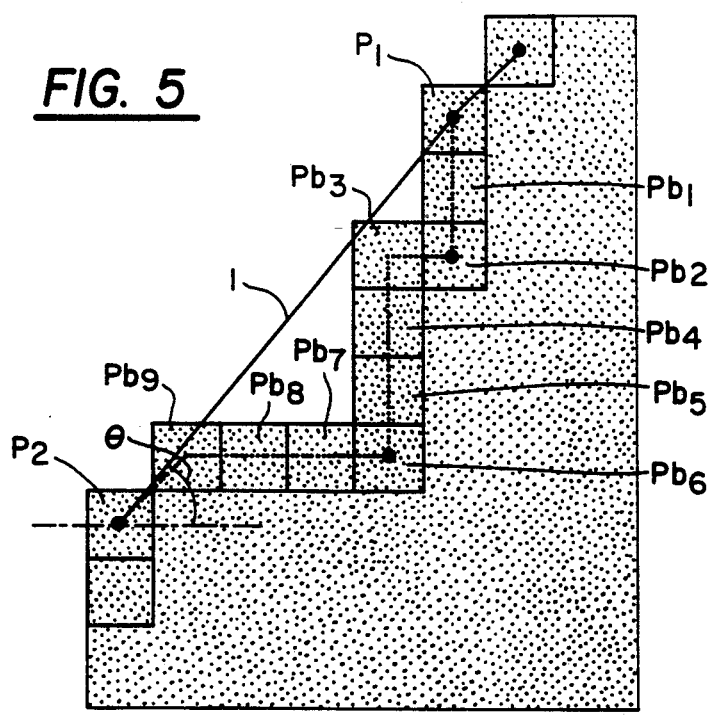
FIG. 5 shows another configuration including concavities.

FIG. 5 shows another configuration to be processed. The configuration has boundary pixels from Pb1 to Pb9 between top points P1 and P2. The distances of each boundary pixel from the line 1 connecting P1 and P2 are shown in Table 3. The inclination of line 1 is 6/5 = 1.20, and the inclination angle $\theta$ is 50.2 deg.

TABLE 3

| Boundary pixel | Distance |
| --- | --- |
| Pb1 | 0.640 |
| Pb2 | 1.280 |
| Pb3 | 0.512 |
| Pb4 | 1.152 |
| Pb5 | 1.792 |
| Pb6 | 2.432 |
| Pb7 | 1.664 |
| Pb8 | 0.896 |
| Pb9 | 0.128 |

In Table 3, Pb2 has a distance more than "1", Pb3 has a distance less than "1", and Pb4 has a distance more than "1" again. In this case, concavity may be defined in two manners. In the first manner, one concavity is defined by the boundary pixels from Pb1 to Pb9. In the second manner, two concavities are defined, that is, one concavity is defined by the boundary pixels from Pb1 to Pb3 and the other concavity is defined by the boundary pixels from Pb4 to Pb9.

Figure 6A:
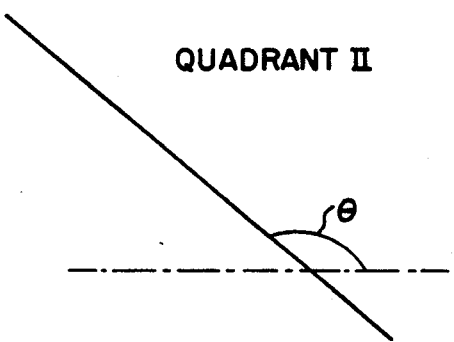
FIGS. 6A-C show an inclined line connecting adjacent two top points on convex hull.
Figure 6B:
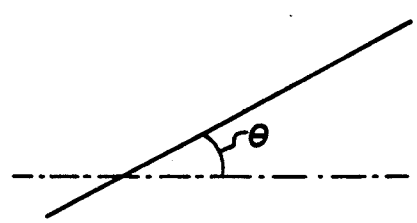
Figure 6C:
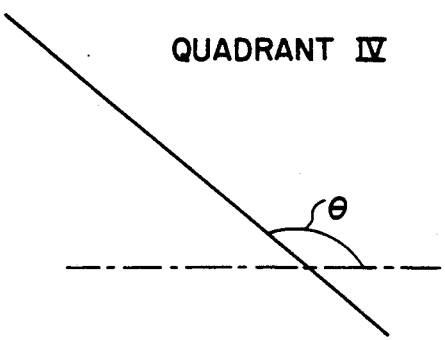

Table 1 shows distance increment in the first quadrant. The following Table 4 shows distance increment in the quadrants from the second to the fourth. The inclination angle $\theta$ is defined for each quadrant as shown in FIG. 6.

TABLE 4

| Quadrant | Chain code | $\Delta^d$ |
| --- | --- | --- |
| II | 6 | $\cos\theta$ |
|  | 7 | $\sin\theta + \cos\theta$ |
|  | 0 | $\sin\theta$ |
| III | 0 | $-\sin\theta$ |
|  | 1 | $\cos\theta - \sin\theta$ |
|  | 2 | $\cos\theta$ |
| IV | 2 | $\cos\theta$ |
|  | 3 | $-\sin\theta - \cos\theta$ |
|  | 4 | $\sin\theta$ |

In the above rule, a concavity is defined when one or more boundary pixels has distance not less than "1". Such distance may be another value, for example "2" considering noises.

In a practical processing of concavities, data in Table 2 is successively read out, distances are calculated with integrating distance increment, simultaneously the chain codes are evaluated according to the rule shown in FIG. 3. When the integrated value reaches predetermined value or the chain code becomes a value other than the value shown in FIG. 3, a concavity is found. By counting boundary pixels on tracing, inner peripheral length is simultaneously calculated. The chord length is obtained by calculating distance between top points.

As for generating an exact convex hull, the inventor invented the following image processing method, which is filed in the United States with application number of Ser. No. 07/301,350.

Figure 7:
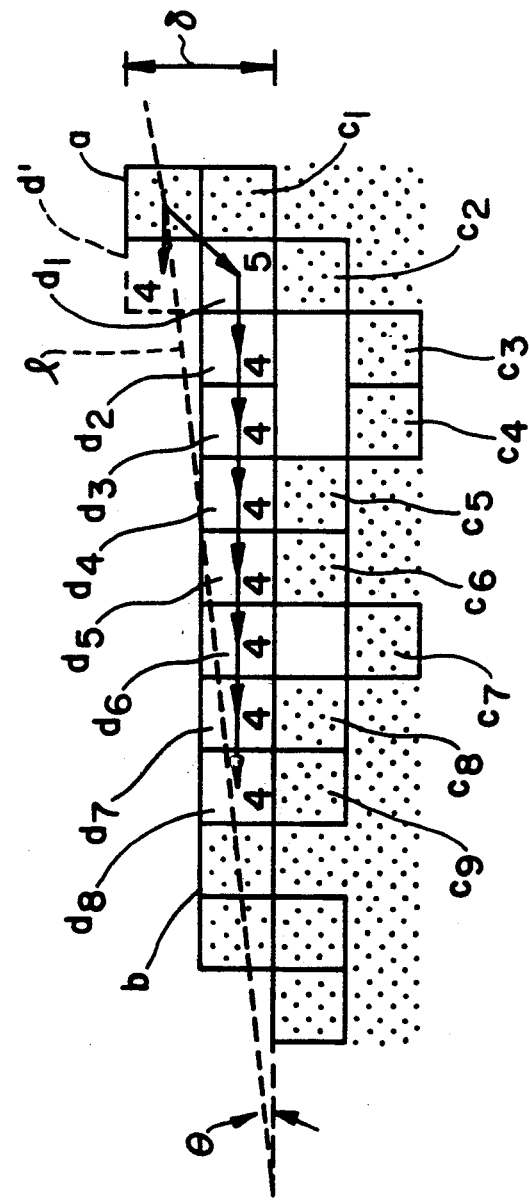
FIG. 7 shows steps of generating convex hull.

FIG. 7 shows two adjacent top points a and b on convex hull as well as boundary pixels C1 to C9 therebetween. Top points a and b are connected with a line 1 for defining an inclination from a to b. For generating convex hull, continuous pixel train is generated from a to b. Each pixel of the train is inside of the line as well as the nearest pixel among pixels continuous to the previous pixel on the train. In this case, the pixel train is generated anticlockwisely. Clockwise pixel train may also be applied.

The chain code of each pixel of the chain code train is limited to be "4" or "5". The pixel d' of chain code "4" next to a is nearer than the pixel d1 of chain code "5". However the pixel of chain code "4" is outside of the line 1. Then the pixel d1 is selected. Thereafter, pixels inside of the line 1 as well as nearest to the line 1 among the pixels continuous to the previous pixel on the pixel train. The pixels from d2 to d8 are to be selected. The convex hull is exactly generated by the method above.

When each pixel of the pixel train generated are indexed by a specified density or any other index, the chord length is defined by the number of indexed pixels. In the configurations generated by subtraction of the original image from the convex hull, the number of boundary pixels without index defines the inner peripheral length of concavity.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modification are intended to be included within the scope of this invention as defined in the following claims.

What is claimed is:

1. An image processing method for recognizing a configuration in an image from a characteristics representation of the configuration comprising the steps of:
    representing the image as digital pixels;
    generating a convex hull for the configuration, said convex hull delineated by a series of pixels connecting top points of the configuration;
    generating a representation of the configuration as characteristics of the difference between the convex hull and the configuration, said characteristics including concavities in the configuration; and
    wherein the step of generating a representation of the configuration includes steps of:
    representing a contour of the configuration between two adjacent top points as a series of chain codes, said top points defining a straight line segment;
    calculating separation distances between the contour of the configuration and the straight line segment; and
    generating a representation of the contour as a concavity when a separation distance is greater than a predetermined value.

2. An image processing method according to claim 1, wherein boundary pixels of said configuration are divided into groups of possible chain codes included in a area other than a concavity.

3. An image processing method according to claim 2, wherein said groups comprise four quadrants.

4. An image processing method according to claim 3, wherein said quadrants are defined by most upper, most leftward, most lower and most rightward boundary pixels.

5. An image processing method according to claim 4, wherein said possible chain codes are defined as follows;
    between most upper and most leftward boundary pixels: chain code=1, 5 or 6
    between most left and most lower boundary pixels: chain code=6, 7 or 0
    between most lower and most rightward boundary pixels: chain code=0, 1 or 2
    between most rightward and most upper boundary pixels: chain code=2, 3 or 4.

6. An image processing method according to claim 2, wherein the step of calculating separation distances includes steps of:
    calculating distance increments for each chain code; and
    integrating distance increments of pixels as processed from one of said top points toward the other.

7. An image processing method according to claim 2, wherein number of boundary pixels are counted between said two top points on evaluating chain codes or on calculating distances, and total number of boundary pixels are counted when said boundary pixels are found to define a concavity, so as to calculate inner peripheral length of a concavity.

* * * * *